(No Model.)
W. H. SHAW.
MANGER.
No. 429,969. Patented June 10, 1890.
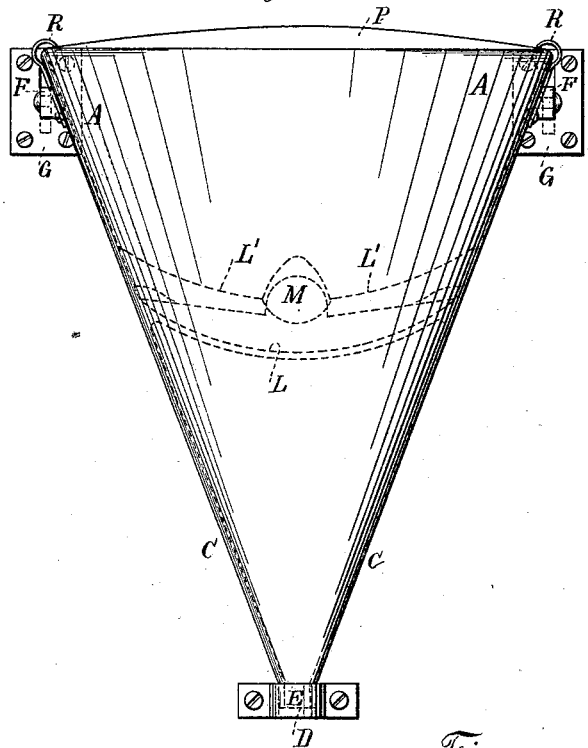
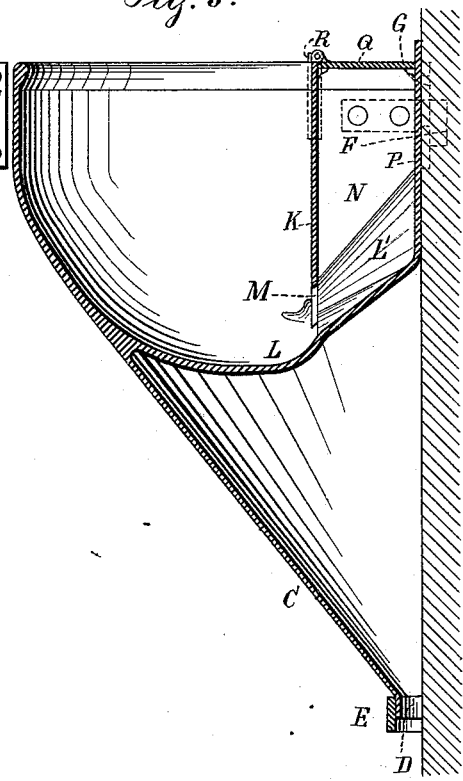
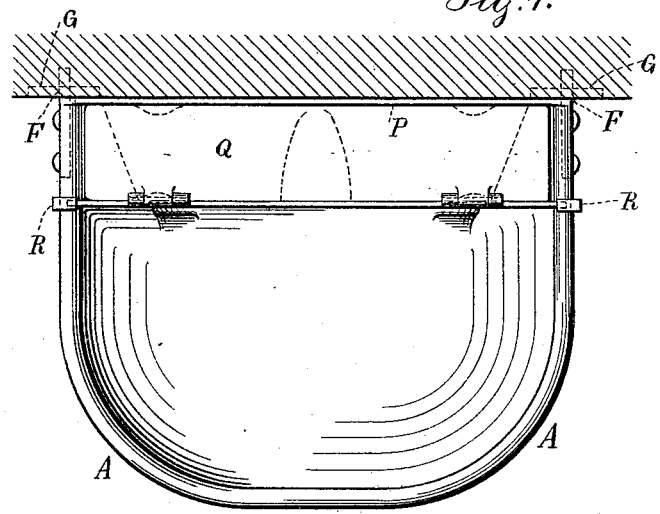
Witnesses:
J. Stait
Chas. H. Smith
Inventor:
William H. Shaw
per Lemuel W. Serrell
Atty

UNITED STATES PATENT OFFICE.

WILLIAM H. SHAW, OF BROOKLYN, NEW YORK.

MANGER.

SPECIFICATION forming part of Letters Patent No. 429,969, dated June 10, 1890.

Application filed July 1, 1889. Serial No. 316,138. (No model.)

*To all whom it may concern:*

Be it known that I, WILLIAM H. SHAW, of Brooklyn, in the county of Kings and State of New York, have invented an Improvement in Mangers, of which the following is a specification.

Feed-mangers for horses have been made in which a separate receptacle was provided at one side for the oats or other feed, there being an opening at the bottom of the receptacle to allow the oats to gradually feed into the manger, and in some instances the mangers have been removable.

My present invention is especially adapted to horse-stalls in which the space is comparatively restricted and in which a permanent manger is disadvantageous; and my invention relates to a peculiar construction of portable manger that prevents the horse disconnecting the manger by any movement in the stall or by the halter coming in contact with such manger, thereby avoiding the difficulty heretofore experienced of the portable manger coming unhooked and falling down and either spilling the contents or becoming injured.

In the drawings, Figure 1 is a plan view of my improved manger. Fig. 2 is an elevation of the same. Fig. 3 is a vertical section.

The manger is usually made with a rounding front, as shown at A, and the top edges near the back are parallel, or nearly so, to each other, and the sides of the manger converge downwardly, so as to be similar to a half-cone in their general configuration, as seen at C C; and at the apex of the cone is a stud or pin D, preferably hollow, as shown, and entering a loop or socket E, that is permanently secured to the wall of the building or of the stall; and at the upper part of the manger, and projecting rearward from the back corners, are the hooks F, either cast with or attached to the manger; and there are upon the wall of the stall or building slotted plates G, firmly secured and adapted to receive the hooks F, such hooks being passed through the slots in the plates and the points of the hooks passing down behind the plates G as the stud D passes into the loop or socket E. The manger is removed by lifting the same vertically and withdrawing the hooks F from the slotted plate G, and it is now to be understood that, the converging sides C of the manger being conical and smooth, there is nothing to catch a halter or against which the horse can exert a sufficient lifting force to raise the manger and disconnect the same. This is a great convenience and effectually prevents injury to the manger by its becoming unhooked and falling; and it will be apparent, upon an inspection of Fig. 3, that the plate G can be let into the wall, so that the manger will sit tightly back against the same, and there will be no projection upon the wall to injure the horse when the manger is removed.

In order to lessen the risk of the food being thrown out of the manger by the horse's nose, I provide a partition K, which may be movable and pass into notches or channels in the inner faces of the manger, and the bottom edge of this partition K rests upon the bottom L of the manger, and there is a central opening M in the partition that allows the oats or other food to feed down gradually from the box N, that receives such food, such box N being formed of the back plate P of the manger, the partition K, and the sides and bottom L' of the manger; and it is preferable to provide a movable cover Q to the receptacle N, that can be raised for the introduction of the feed, and where this cover Q is hinged to the partition K the cover and partition can be removed together when the manger is to receive soft feed or water; and I make use of spring-catches R, fastened upon the exterior surfaces of the manger and their upper ends springing over the upper edge of the partition K, so that these catches R hold the partition K in position and prevent the horse lifting the same when feeding in the manger; and the bottom L' of the manger below the receptacle N is to be inclined, as shown in Figs. 2 and 3, so that the entire contents of such receptacle N will run out through the opening M in the partition K and pass into the bottom part of the manger, where they can easily be taken by the horse.

I claim as my invention—

1. The manger having a rounding front A, a flat back P to sit against a wall, a bottom L L', and downwardly-converging or conical sides C below the bottom of manger, in combination with hooks and wall-plates for removably supporting the upper part of the manger, and a socket for receiving the lower end of the conical sides, substantially as specified.

2. The manger having a rounding front A, a flat back P to sit against a wall, a bottom L L', and downwardly-converging or conical sides C below the bottom of manger, in combination with hooks and wall-plates for removably supporting the upper part of the manger, a socket for the lower end of the conical sides, a removable partition K within the manger, and a cover Q, connected to the top edge of the partition, substantially as specified.

Signed by me this 28th day of June, 1889.

WILLIAM H. SHAW.

Witnesses:
JOHN NOERMANN,
J. D. H. BERGEN.